United States Patent
Khaled et al.

(10) Patent No.: US 10,094,264 B2
(45) Date of Patent: Oct. 9, 2018

(54) REDUCTANT TANK SENSOR DIAGNOSTIC METHOD AND SYSTEM

(71) Applicant: Cummins Emission Solutions, Inc., Columbus, IN (US)

(72) Inventors: Nassim Khaled, Columbus, IN (US); Vinayak Mandavkar, Columbus, IN (US); Deepu Chandy, Columbus, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 261 days.

(21) Appl. No.: 14/530,091

(22) Filed: Oct. 31, 2014

(65) Prior Publication Data

US 2016/0040580 A1 Feb. 11, 2016

(30) Foreign Application Priority Data

Aug. 6, 2014 (EP) .................. 14180096

(51) Int. Cl.
*F01N 3/00* (2006.01)
*F01N 11/00* (2006.01)
(Continued)

(52) U.S. Cl.
CPC ............ *F01N 11/00* (2013.01); *F01N 3/208* (2013.01); *F02B 77/083* (2013.01);
(Continued)

(58) Field of Classification Search
CPC ............ F01N 11/00; F01N 2900/0416; F01N 2900/1814; B60K 15/03006; B60K 2015/03217
See application file for complete search history.

(56) References Cited

U.S. PATENT DOCUMENTS 7,631,556 B2  12/2009  Moening et al.
7,878,057 B2   2/2011  Wang et al.
(Continued)

FOREIGN PATENT DOCUMENTS

DE  1020100 12 630  9/2011
EP     2 071 145    6/2009
(Continued)

OTHER PUBLICATIONS

Extended European Search Report issued in European Patent Application No. 14180096.1, dated Feb. 6, 2015.
(Continued)

*Primary Examiner* — Jason Sheppard
(74) *Attorney, Agent, or Firm* — Foley & Lardner LLP (57) ABSTRACT

A system for diagnosing a sensor of an exhaust aftertreatment system may include receiving a first tank level value from a sensor. A plurality of reductant dosing command values over a period of time are received. A dosed reductant value is determined responsive to the plurality of reductant dosing command values reaching a threshold integrated value. A second tank level value is received from the sensor responsive to the dosed reductant value reaching the threshold integrated value. A sensor-estimated dosing value is determined based on the difference between the first tank level value and the second tank level value. The sensor may be diagnosed as performing outside of an acceptable calibration range based on the difference between the sensor-estimated dosing value and the dosed reductant value.

24 Claims, 9 Drawing Sheets

(51) Int. Cl.
   *F01N 3/20* (2006.01)
   *F02D 41/22* (2006.01)
   *F02B 77/08* (2006.01)

(52) U.S. Cl.
   CPC ........ *F02D 41/222* (2013.01); *F01N 2550/05* (2013.01); *F01N 2610/02* (2013.01); *F01N 2900/0416* (2013.01); *F01N 2900/0418* (2013.01); *F01N 2900/0601* (2013.01); *F01N 2900/1812* (2013.01); *F01N 2900/1814* (2013.01); *Y02T 10/24* (2013.01); *Y02T 10/40* (2013.01); *Y02T 10/47* (2013.01)

(56) References Cited

U.S. PATENT DOCUMENTS

| | | | |
|---|---|---|---|
| 8,047,046 B2 | 11/2011 | Stark et al. | |
| 8,549,911 B2 | 10/2013 | Rudd et al. | |
| 8,899,021 B2* | 12/2014 | Dingle | F01N 3/021 60/274 |
| 9,322,316 B2* | 4/2016 | Jung | F01N 11/00 |
| 2009/0301067 A1* | 12/2009 | Dingle | F01N 3/021 60/286 |
| 2010/0145638 A1* | 6/2010 | Begin | G01F 23/0076 702/55 |
| 2012/0304626 A1 | 12/2012 | Maus et al. | |
| 2015/0211914 A1* | 7/2015 | Dudar | G01F 23/246 73/292 |
| 2016/0017781 A1* | 1/2016 | Nihongi | G01F 23/64 73/61.43 |

FOREIGN PATENT DOCUMENTS

| | | |
|---|---|---|
| EP | 2 369 150 | 9/2011 |
| EP | 2 840 240 | 2/2015 |
| JP | 2007-010574 | 1/2007 |
| WO | WO 02/053892 | 7/2002 |

OTHER PUBLICATIONS

Chinese Office Action dated Feb. 11, 2018 for Chinese Patent Application No. 2015104722016, 5 pages.

* cited by examiner

REDUCTANT TANK SENSOR DIAGNOSTIC METHOD AND SYSTEM

CROSS-REFERENCE TO RELATED APPLICATION

The present application claims the benefit of and priority to European Patent Application Serial No. 14180096.1, filed Aug. 6, 2014, which is incorporated herein by reference in its entirety.

TECHNICAL FIELD

The present application relates generally to the field of sensors for an aftertreatment system.

BACKGROUND

For internal combustion engines, such as diesel engines, nitrogen oxides ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber.

Prior to being dosed into the exhaust pipe of the exhaust system, the reductant is stored in a tank and engines may monitor the amount of reductant, such as urea or diesel exhaust fluid (DEF) present in the tank. To monitor the amount of stored reductant, a sensor or multiple sensors may be coupled to the tank. In some systems, the stored reductant is also used as coolant for the dosing module. Use of urea or DEF as a coolant requires a reserve amount of the reductant be present in the tank to allow for recirculation. At low tank-level sensor values, dosing must stop to ensure sufficient urea for coolant recirculation, which brings tank-level sensors within the scope of the on-board diagnostic system. Thus, various OBD requirements, including requirements stipulated by the United States Environmental Protection Agency (EPA) and the California Air Resources Board (CARB), mandate diagnosing these tank-level sensors as part of $NO_x$ emission reduction control.

SUMMARY

A computer-implemented method for diagnosing a sensor of a reductant tank of an aftertreatment exhaust system. A first tank level value is received from a sensor. A plurality of reductant dosing command values are received over a period of time. A dosed reductant value is determined responsive to the plurality of reductant dosing command values reaching a threshold integrated value. A second tank level value is received from the sensor responsive to the dosed reductant value reaching the threshold integrated value. A sensor-estimated dosing value is determined based on the difference between the first tank level value and the second tank level value. It is then diagnosed whether the sensor is performing outside of an acceptable calibration range based on the difference between the sensor-estimated dosing value and the dosed reductant value.

Another implementation relates to a system having a sensor and a controller configured to perform the steps of a computer-implemented method for diagnosing a sensor of a reductant tank of an aftertreatment exhaust system.

Yet another implementation relates to an apparatus comprising one or more modules configured to perform the operations set forth in the steps of a computer-implemented method for diagnosing a sensor of a reductant tank of an aftertreatment exhaust system.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for diagnosing rationality of a sensor for a reductant tank. The various concepts introduced above and discussed in greater detail below may be implemented in any of numerous ways, as the described concepts are not limited to any particular manner of implementation. Examples of specific implementations and applications are provided primarily for illustrative purposes.

Overview

One or more sensors are utilized to determine and/or estimate the amount of reductant within a storage tank. However, such sensors may be faulty initially and/or degrade over time and/or usage. For instance, a sensor may develop an abnormal gain for an output value from the sensor and/or an abnormal offset to the output value from the sensor. Such characteristics, gain and/or offset, of the output signal of the sensor may negatively affect an aftertreatment system of the engine by making the system assume there is more or less reductant in the tank than is actually present. In the case of a reductant-cooled dosing module, a high assumption defect could cause damage to the dosing module by allowing the system to dose reductant beyond the minimum level required to maintain coolant recirculation. A low assumption defect could cause the dosing module to stop dosing prematurely, negatively affecting the performance of the aftertreatment system. Thus, determining whether the sensor is defective or not defective can impact various aspects of an aftertreatment system and/or engine.

Implementations described herein involve performing rationality diagnoses to determine whether the sensor is defective or not defective. In general, a rationality diagnosis of a sensor involves comparing a sensor reported value to a reference value and identifying any low or high biases in the reported value. In some implementations, an algorithmic rationality diagnosis is performed by a controller comparing a sensor-estimated dosing value with a dosed reductant value determined from integrated commanded reductant feedback. The sensor-estimated dosing value is based on the difference between two sensor-estimated tank levels at the beginning and end of a monitored time period. The dosed reductant value is based on commanded reductant feedback integrated over the same monitored time period.

In one scenario, the controller may determine that that the sensor has a positive or negative gain defect in response to a comparison of the sensor-estimated dosing value and the dosed reductant value. A positive or negative gain defect may occur when the tank level corresponding with the sensor-estimated dosing value is greater or less than threshold reference values.

In another scenario, the controller may determine that the sensor has a positive offset. This may occur when, after determining that the tank is initially full, the controller determines the drop in the tank level corresponding to the sensor-estimated dosing value is less than a predetermined dosed reductant value. In yet another scenario, the controller may determine that the sensor has a negative offset. This may occur when, after determining that the tank level is initially less than a calibration value—for example, a tank level indicating the tank is 80 percent full—the controller determines the drop in the tank level corresponding to the sensor-estimated dosing value is less than a predetermined dosed reductant value. In the offset scenario, a sensor would falsely indicate a tank level that appears constant due to the existence of a dead-band volume (the excess volume at the top of the tank beyond which the tank level sensor would report 100 percent).

In any of the aforementioned implementations, the controller determines the sensor is defective or not defective irrespective of the underlying technology of the sensing mechanism.

Overview of Aftertreatment System

Figure 1:
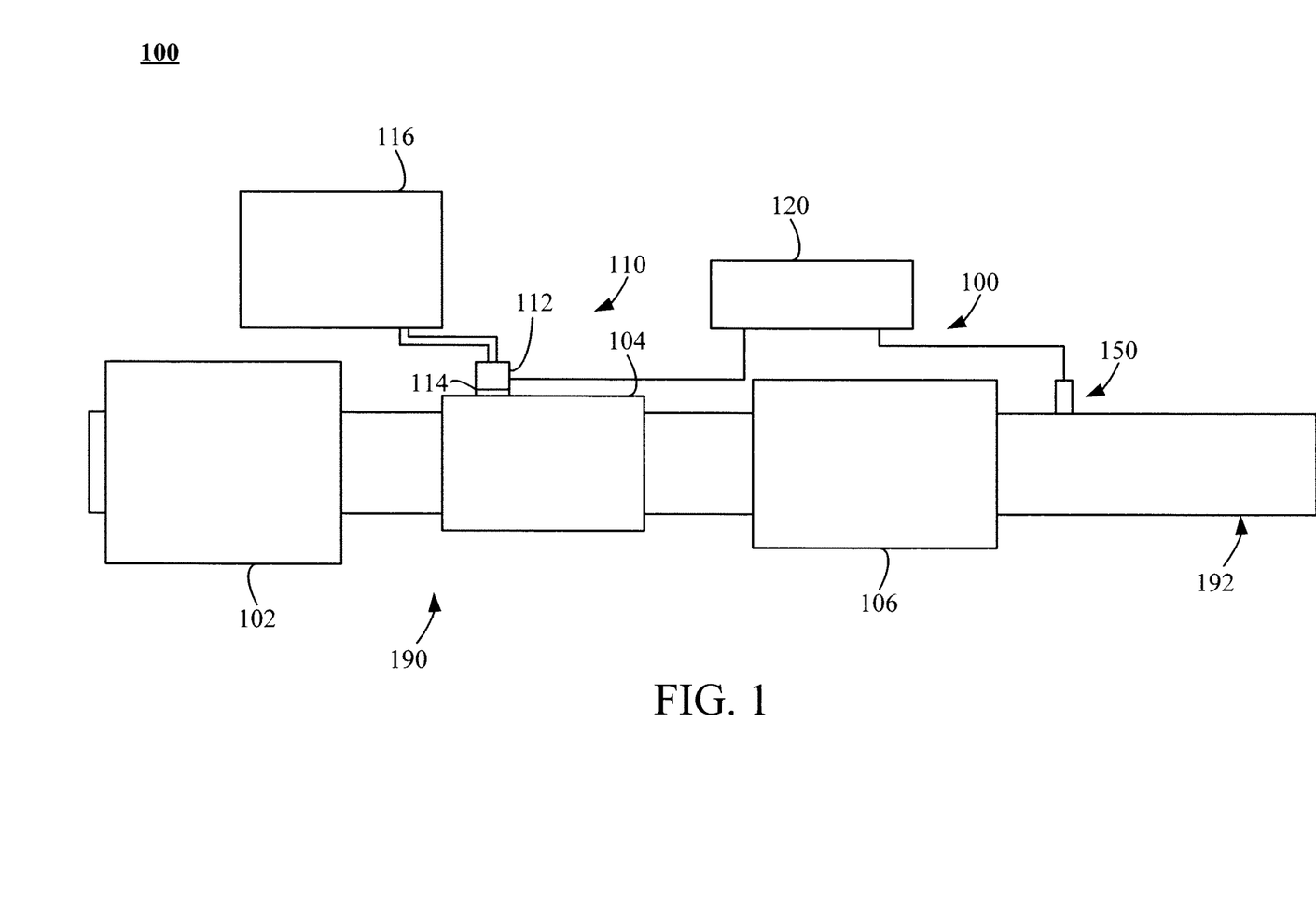
FIG. 1 is a schematic block diagram of a selective catalytic reduction system having a reductant delivery system for an exhaust system.

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor probe 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or DEF, into ammonia. The decomposition chamber 104 includes a reductant delivery system 110 having a dosing module 112 configured to dose the reductant into the decomposition chamber 104. In some implementations, the urea, aqueous ammonia, DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose a reductant, such as urea, aqueous ammonia, or DEF, into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant tanks 116. In some implementations, a pump (not shown) may be used to pressurize the reductant tank 116 for delivery to the dosing module 112. The reductant tank 116 also includes a tank level sensor 118.

The tank level sensor 118 and the dosing module 112 are electrically or communicatively coupled to a controller 120. The controller 120 is configured to receive tank level values from the tank level sensor 118. The controller 120 is also configured to control the dosing module 112 to dose reductant into the decomposition chamber 104. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language. The controller 120 may be configured to control other components of the exhaust system 190 and/or an engine or other components associated with the exhaust system 190. For instance, the controller 120 may be configured to modify an operating condition of the engine, to modify an operating condition of an EGR valve or system, to initiate or stop a regeneration process, etc.

The SCR catalyst 106 is configured to assist in the reduction of NOx emissions by accelerating a NOx reduction process between the ammonia and the NOx of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end 192 of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

The sensor probe 150 may be coupled to the exhaust system 190 to detect a condition of the exhaust gas flowing through the exhaust system 190. While the sensor probe 150 is depicted as positioned downstream of the SCR catalyst 106, it should be understood that the sensor probe 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. Still further configurations for the sensor probes 150 may be implemented.

In some implementations, the sensor probe 150 is configured to detect a concentration of a compound in the exhaust gas flowing through the exhaust system 190 and to output an output signal to the controller 120. The controller 120 may be configured to use the output signal of from the sensor to modify and/or output a control signal to a component of the exhaust system 190, an engine, and/or another component. For instance, the controller 120 may receive the output signal from the sensor 150 and modify the control signal for the dosing module 112 to increase, decrease, and/or maintain an amount of reductant dosed into the exhaust system 190.

Implementations for Diagnosing Reductant Tank Level Sensors

Sensor-estimated tank volumes and commanded urea volumes may be used to diagnose reductant tank level sensors. In particular, positive or negative gain, or positive or negative offset may be determined. A positive or negative gain may occur when the controller determines that the difference between sensor-estimated tank volumes and the command-estimated dosing volume is outside of an acceptable range. In non-defective circumstances, percent drop in tank level equals percent commanded reductant.

Figure 2:
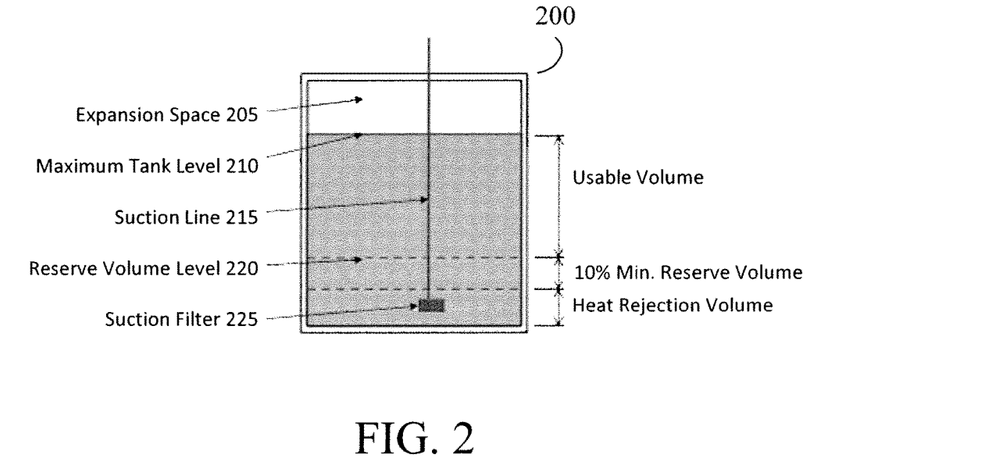
FIG. 2 is a schematic diagram of a reductant tank according to one embodiment.

FIG. 2 is a schematic diagram of a reductant tank according to one embodiment. The reductant tank 200 includes four volumetric regions. A dead band volume portion, or expansion space 205, accommodates expansion of the reductant fluid. A usable volume is located below the expansion space and represents the area where usable reductant is typically located. A maximum tank level 210 forms the boundary between the expansion space 205 and the usable volume. Below the usable volume is a 10% minimum reserve volume, the top of which corresponds to a reserve volume level 220 and also corresponding to 0% on the vehicle dash gauge. A non-consumable heat rejection volume is also provided. The non-consumable heat rejection volume is required for coolant recirculation between the dosing module, the reductant tank, and other coolant-required components of the reductant delivery system (i.e. supply unit or pump). The reductant tank 200 also includes a suction line 215 and a suction filter 225, both in fluid connection with one or both of a supply unit or the dosing module. The reductant is drawn from the tank reservoir by the suction filter 225, and passed through the suction line 215 for delivery to the aftertreatment system.

Figure 3:
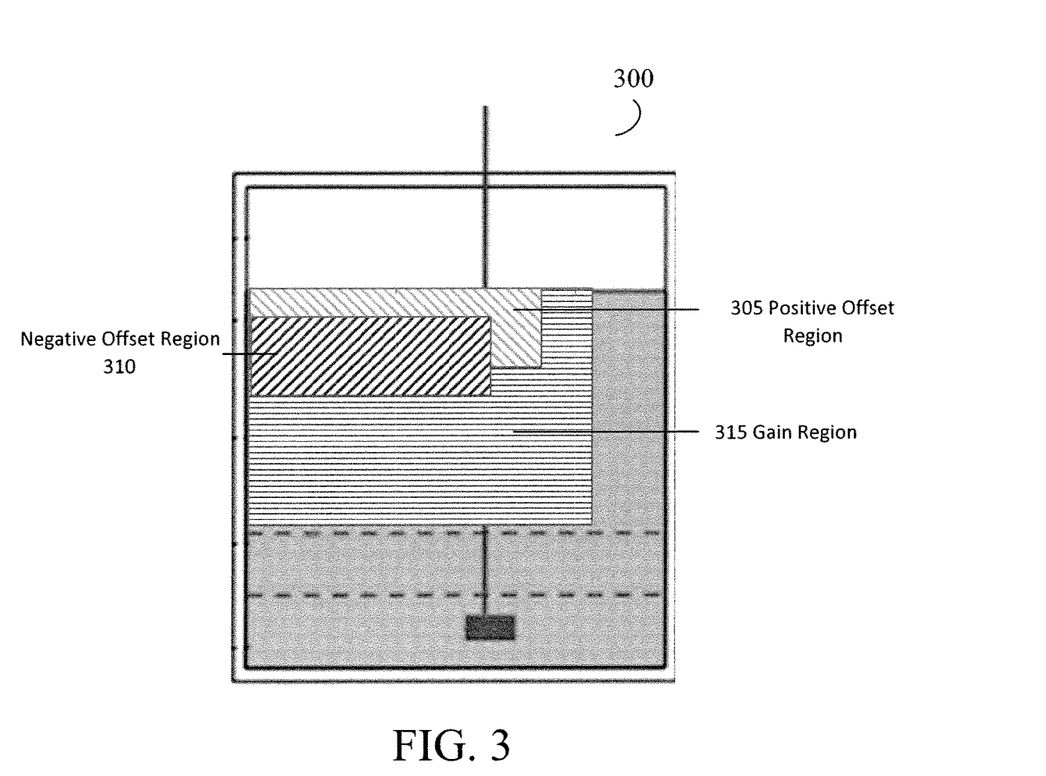
FIG. 3 is a schematic diagram of gain, positive offset, and negative offset diagnostic regions.

FIG. 3 is schematic diagram of the gain, positive offset, and negative offset diagnostic regions. The rationality diagnostic, previously summarized and to be described in greater detail below, is performed to diagnose a tank level sensor. The diagnostic performed for each fault category—gain, positive offset, negative offset—corresponds with a particular volumetric region of the reductant tank 300. A large volumetric region, 315 correspond to gain diagnosis. Second and third smaller volumetric regions, 310 and 305, correspond to negative offset and positive offset diagnosis, respectively.

Figure 4:
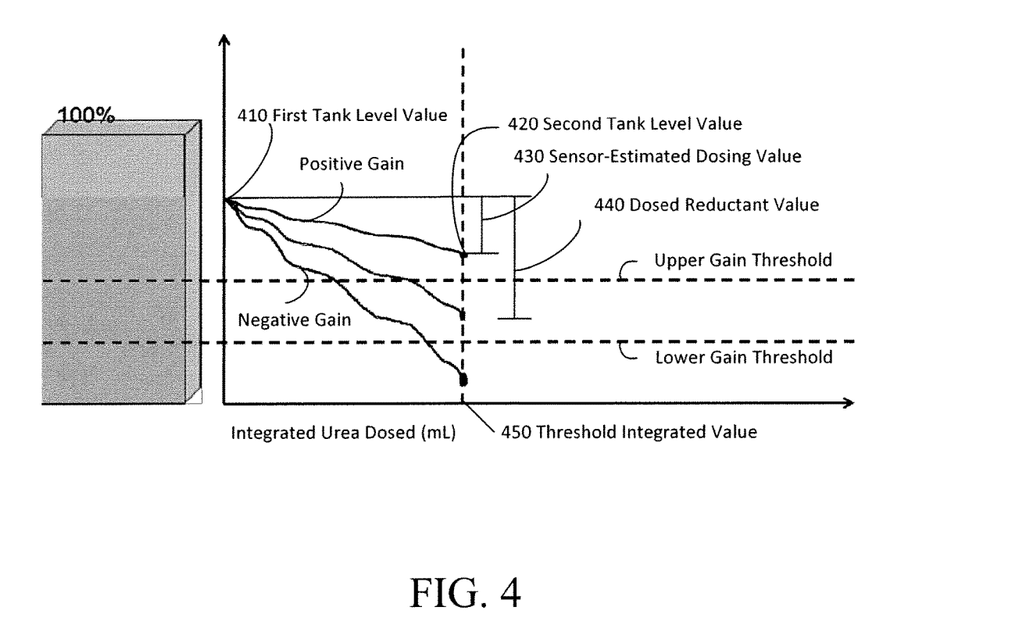
FIG. 4 is a schematic diagram depicting sensor gain diagnosis according to one embodiment
Figure 5:
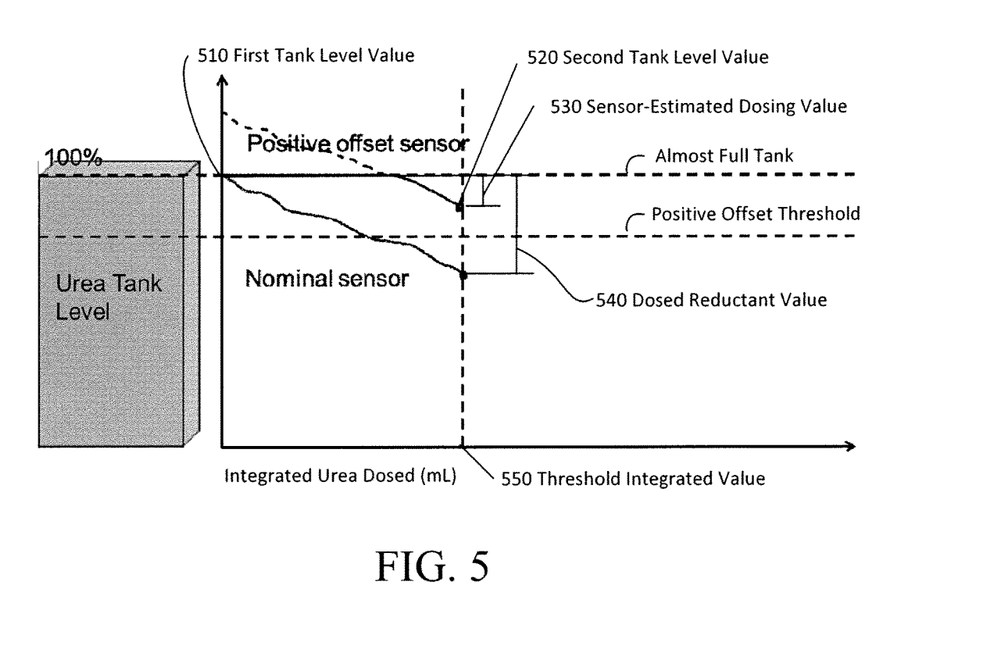
FIG. 5 is schematic diagram depicting sensor positive offset diagnosis according to one embodiment.
Figure 6:
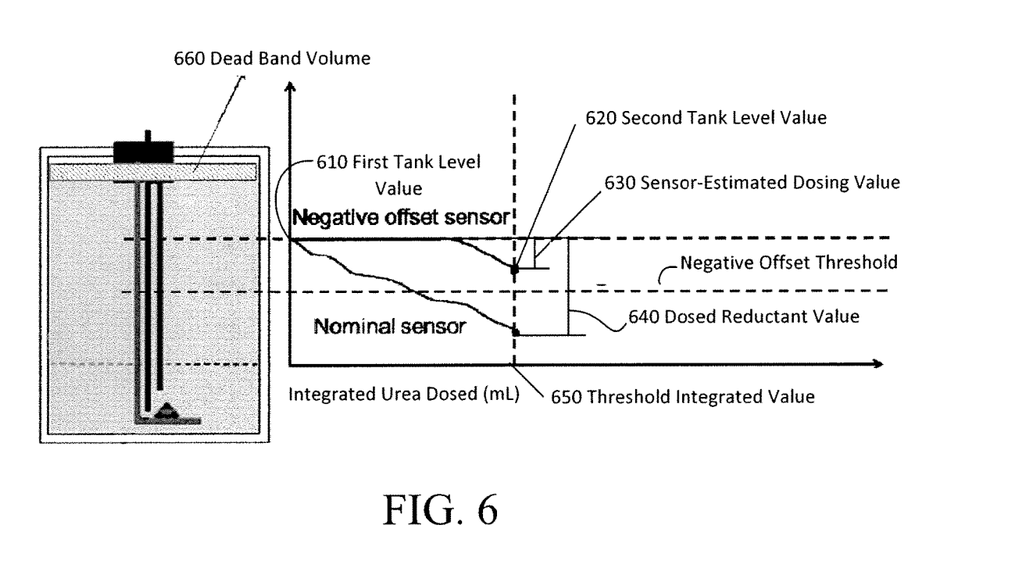
FIG. 6 is a schematic diagram depicting sensor negative offset diagnosis according to one embodiment.

FIG. 4 is a schematic diagram depicting sensor gain detection according to one embodiment. Tank volumes (y axis) and dosing volumes (x axis) are used to diagnose sensor gain. A positive or negative gain defect occurs when the controller determines that the difference between sensor-estimated dosing value 430 and the dosed reductant value 440 is outside of a calibration range (the calibration range bound by upper and lower gain thresholds). FIG. 5 is schematic diagram depicting sensor positive offset detection according to one embodiment. A positive offset is detected when the sensor-estimated dosing value 530 is above a positive offset threshold (level drop is unrealistically small). Similarly, FIG. 6 is a schematic diagram depicting sensor negative offset detection according to one embodiment. A negative offset is detected when the sensor-estimated dosing value is above a negative offset threshold. The acceptable offset threshold is represented in the figures by the positive offset and negative offset threshold levels.

Referring again to the gain detection diagram of FIG. 4, the x-axis represents commanded urea values and the y-axis represents sensor-received tank level values. Initially, a first tank level value 410 is received from a sensor. As urea is dispensed into the system based on a plurality of reductant dosing command values, the volume of urea in the tank decreases. When the plurality of reductant dosing command values reach a threshold integrated value 450 (denoted by the hatched vertical line in the figure), a second tank level value 420 is received from the sensor. The difference between the first tank level value 410 and the second tank level value 420 is the sensor-estimated dosing value 430, or level drop. The dosed reductant value 440 represents the plurality of reductant dosing command values integrated over time until the threshold integrated value 450 is reached. When the sensor-estimated dosing volume 430 is outside of a calibration range, the sensor has a gain. The calibration range 460 is bound by upper and lower gain thresholds which place limits on the acceptable difference between the sensor-estimated dosing volume 430 and the dosed reductant value 440. When the sensor-estimated dosing volume 430 is above the upper gain threshold, the gain is positive; when it is below the lower gain threshold, the gain is negative.

Referring again to the positive offset detection diagram of FIG. 5, in accordance with one embodiment, the x-axis represents commanded urea values. The y-axis represents sensor-received tank level values. Initially, a first tank level value 510 (indicative of a full tank) is received from a sensor in response to a refill event. As urea is dispensed into the system based on a plurality of reductant dosing command values, the volume of urea in the tank decreases. When the plurality of reductant dosing command values reach a threshold integrated value 550 (denoted by the hatched vertical line in the figure), a second tank level value 520 is received from the sensor. The difference between the first tank level value 510 and the second tank level value 520 is the sensor-estimated dosing value 530, or level drop. The dosed reductant value 540 represents the plurality of reductant dosing command values integrated over time. When the sensor-estimated dosing volume 530 is above a positive offset threshold (outside of an acceptable calibration range), the sensor has a positive offset. This occurs when the sensor-estimated dosing value is unrealistically small compared to the dosed reductant value 540. If the sensor-estimated dosing value 530 is below the positive offset threshold, there is no positive offset.

Referring again to the negative offset detection diagram of FIG. 6, in accordance with one embodiment, the x-axis represents commanded urea values and the y-axis represents sensor-received tank level values. To detect a negative offset, the raw tank level value is monitored to detect the presence of a dead band volume 660. Thus, initially, a first tank level value 610 is received. If the first tank level value 610 is indicative of a raw tank level above 80% (detection capability is 20% negative offset), then there is not a negative offset defect in the sensor. If the first tank level value 610 is indicative of a tank level value below 80%, commanded urea is monitored and a plurality of reductant dosing command values are received from the sensor. When the plurality of reductant dosing command values reach a threshold integrated value 650 (denoted by the hatched vertical line in the figure), a second tank level value 620 is received from the sensor. The difference between the first tank level value 610 and the second tank level value 620 is the sensor-estimated dosing value 630, or level drop. The dosed reductant value 640 represents the plurality of reductant dosing command values integrated over time. When the sensor-estimated dosing value 630 is above a negative offset threshold (outside of an acceptable calibration range), the sensor has a negative offset. This occurs when the sensor-estimated dosing volume is unrealistically small compared to the dosed reductant value 640. If the sensor-estimated dosing value 630 is below the negative offset threshold, there is no negative offset.

Figure 7:
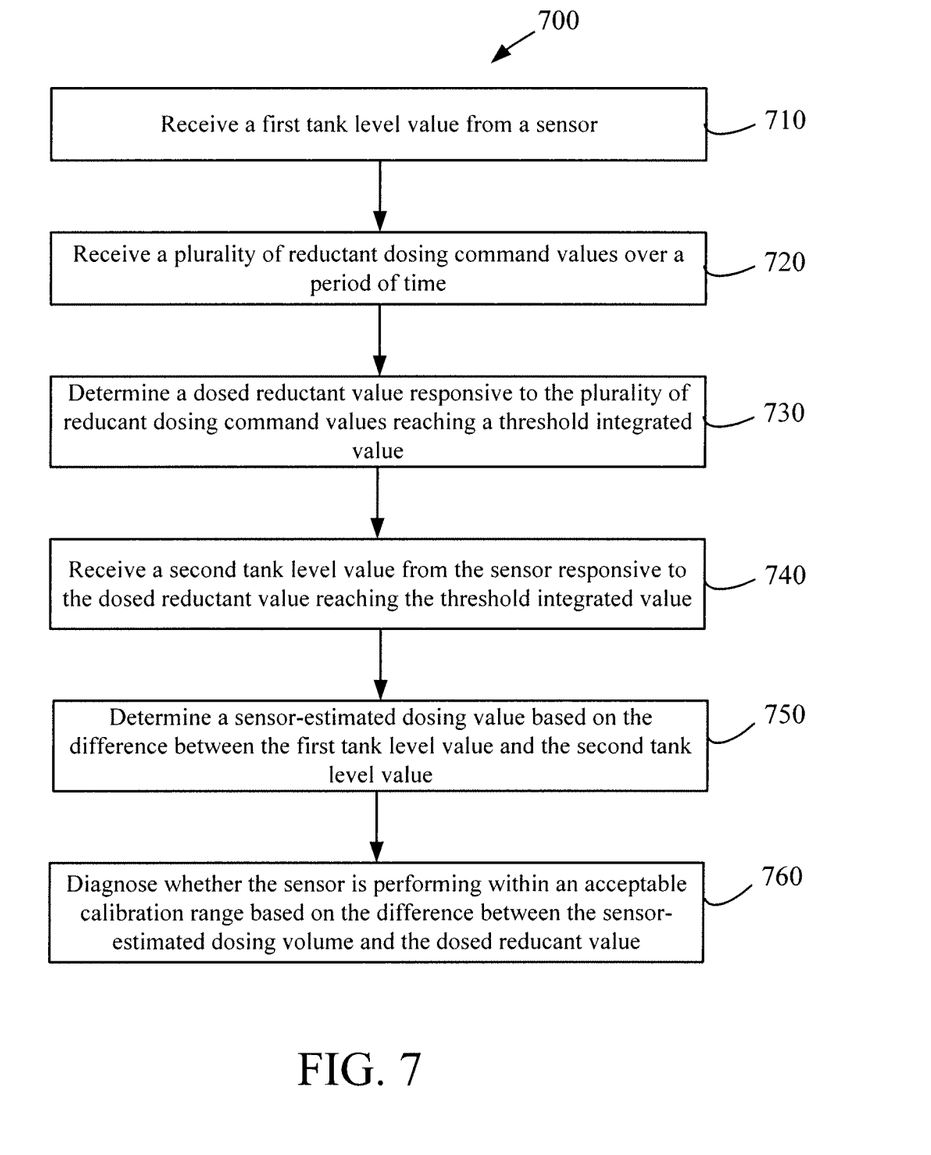
FIG. 7 is a process diagram for a process of diagnosing sensor gain.

FIG. 7 depicts an example process 700 that may be implemented by the system 190 for diagnosing sensor gain. The process 700 may be used to detect both positive and negative sensor gain. The process 700 includes, at 710, receiving a first tank level value from a sensor. At 720, a plurality of reductant dosing command values are received over a period of time. At 730, a dosed reductant value is determined responsive to the plurality of reductant dosing command values reaching a threshold integrated value. At 740, a second tank level value is received from the sensor responsive to the dosed reductant value reaching the threshold integrated value. At 750, a sensor-estimated dosing value is determined based on the difference between the first tank level value and the second tank level value. At 760, it is diagnosed whether the sensor is performing within an acceptable calibration range based on the difference between the sensor-estimated dosing value and the dosed reductant value.

Figure 8:
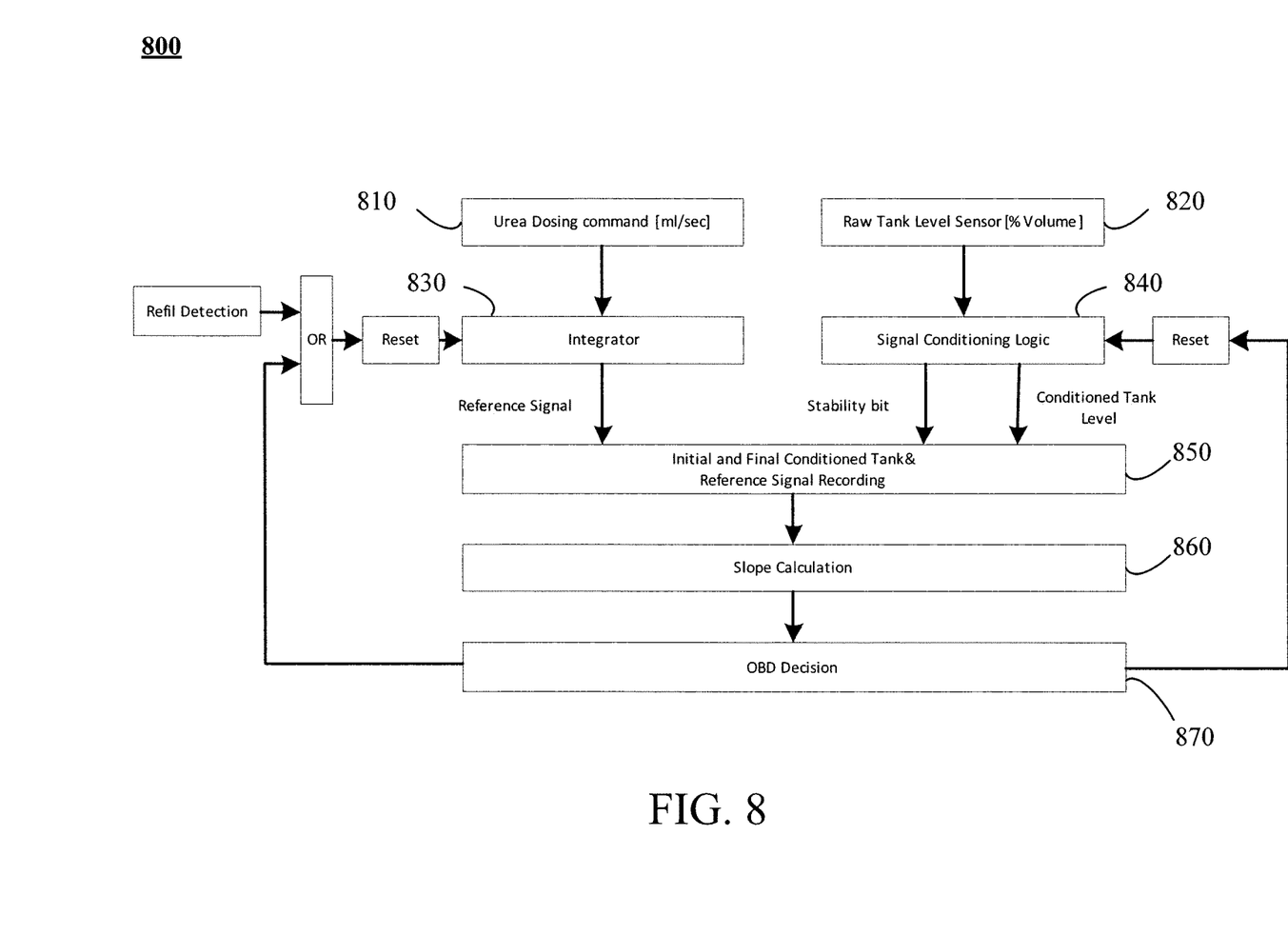
FIG. 8 is a schematic flow chart depicting a process of diagnosing sensor gain according to one embodiment

FIG. 8 is a schematic flow chart depicting a process 800 that may be implemented by the system for diagnosing sensor gain. At 810, urea dosing commands are received. At 830, the urea dosing commands are integrated (converted to a value indicative of a volume). At 820, raw tank level values are received from a sensor. At 840, the raw tank levels are conditioned for use in performing rationality diagnostics on the sensor. At 850, the integrated urea dosing commands and conditioned raw tank level values are recorded. The slope of the recorded conditioned raw tank levels and integrated commanded urea is calculated at 860. At 870, rationality diagnostics are performed on the sensor and a sensor gain diagnostic decision is made. The process 800 repeats itself in response to the diagnostic decision, a refill detection (reset), or other reset event.

Figure 9:
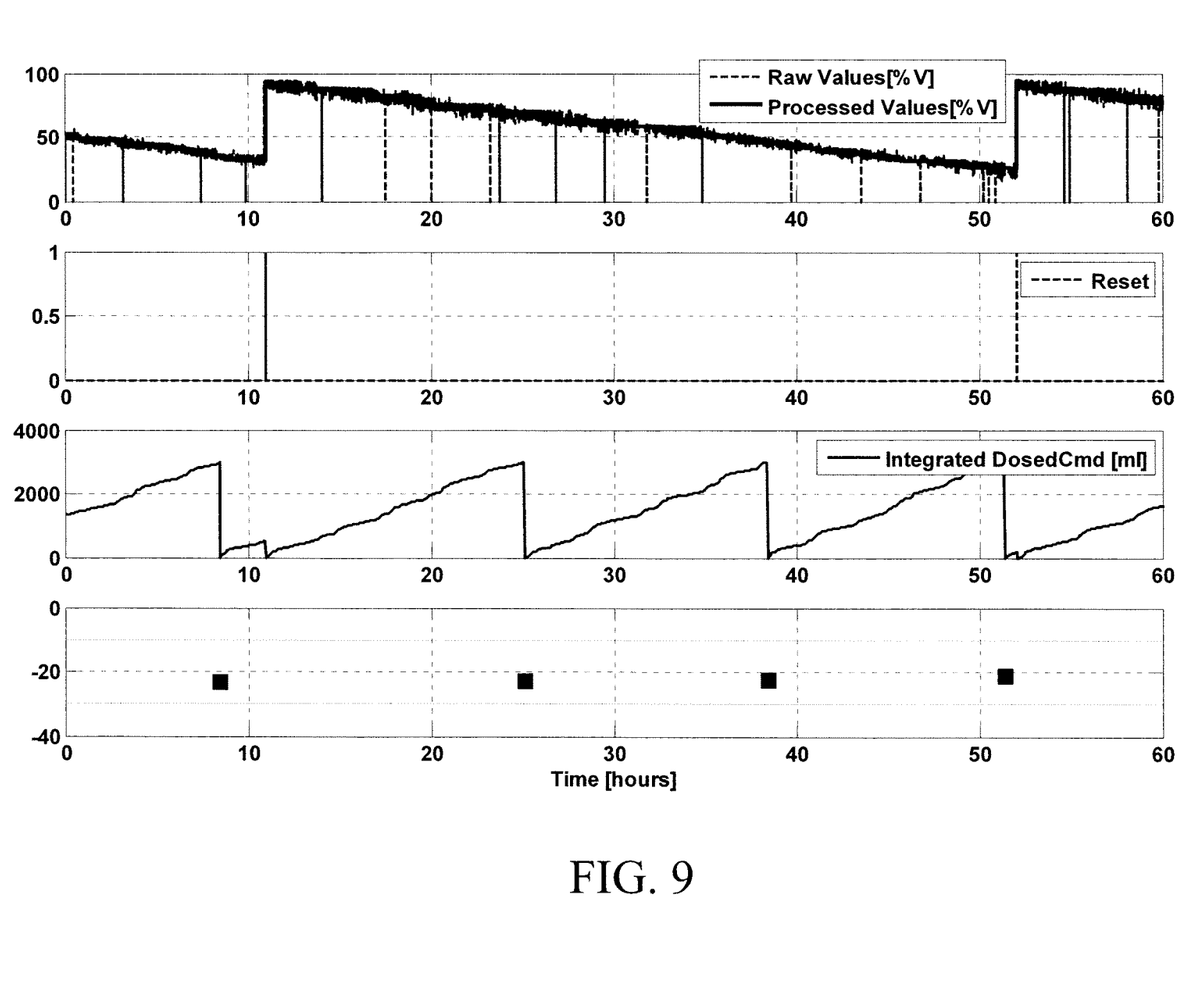
FIG. 9 is a chart depicting an exemplary rationality diagnostic for sensor gain according to one embodiment.
Figure 10:
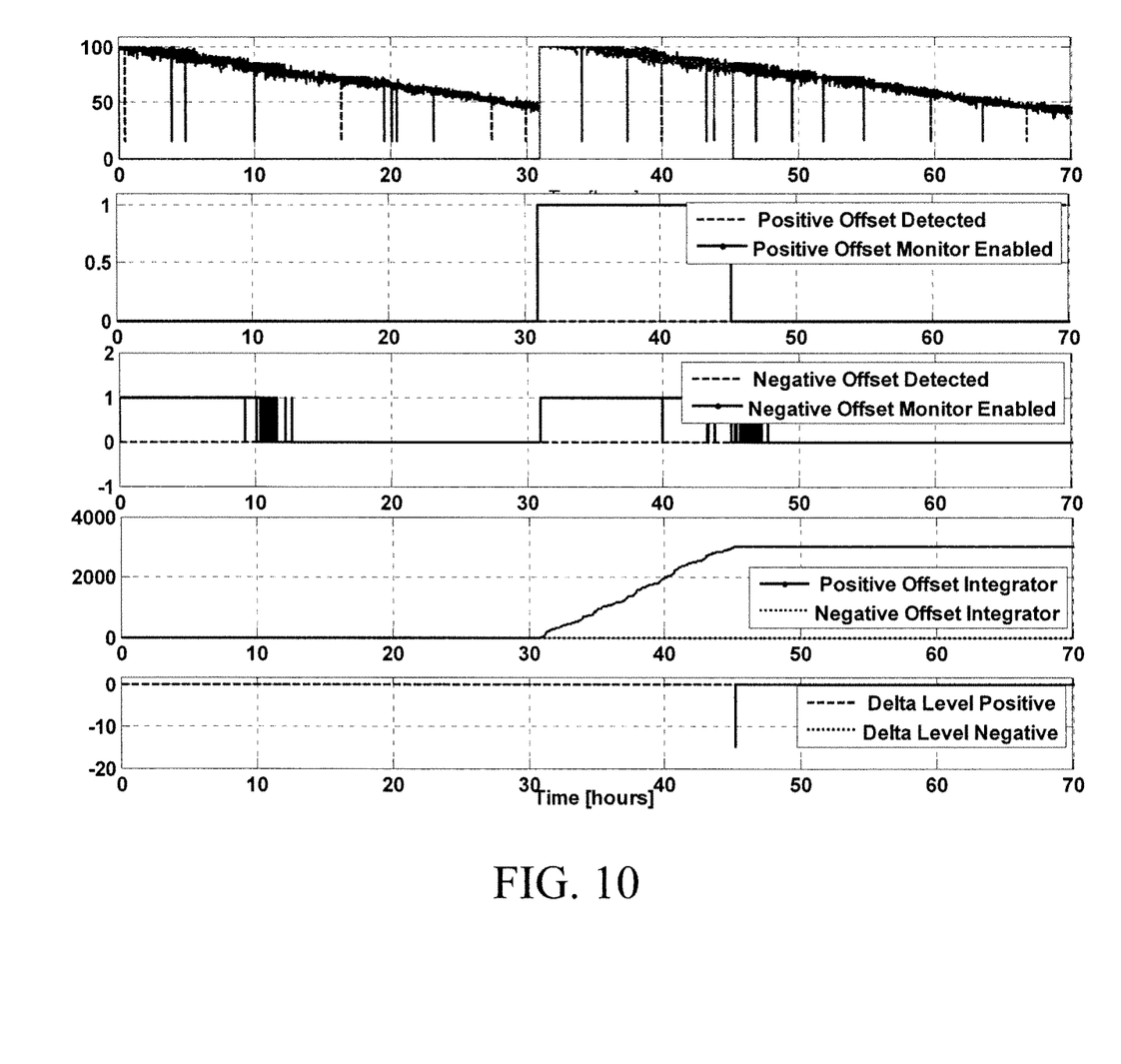
FIG. 10 is a chart depicting an exemplary rationality diagnostic for sensor positive offset according to one embodiment.
Figure 11:
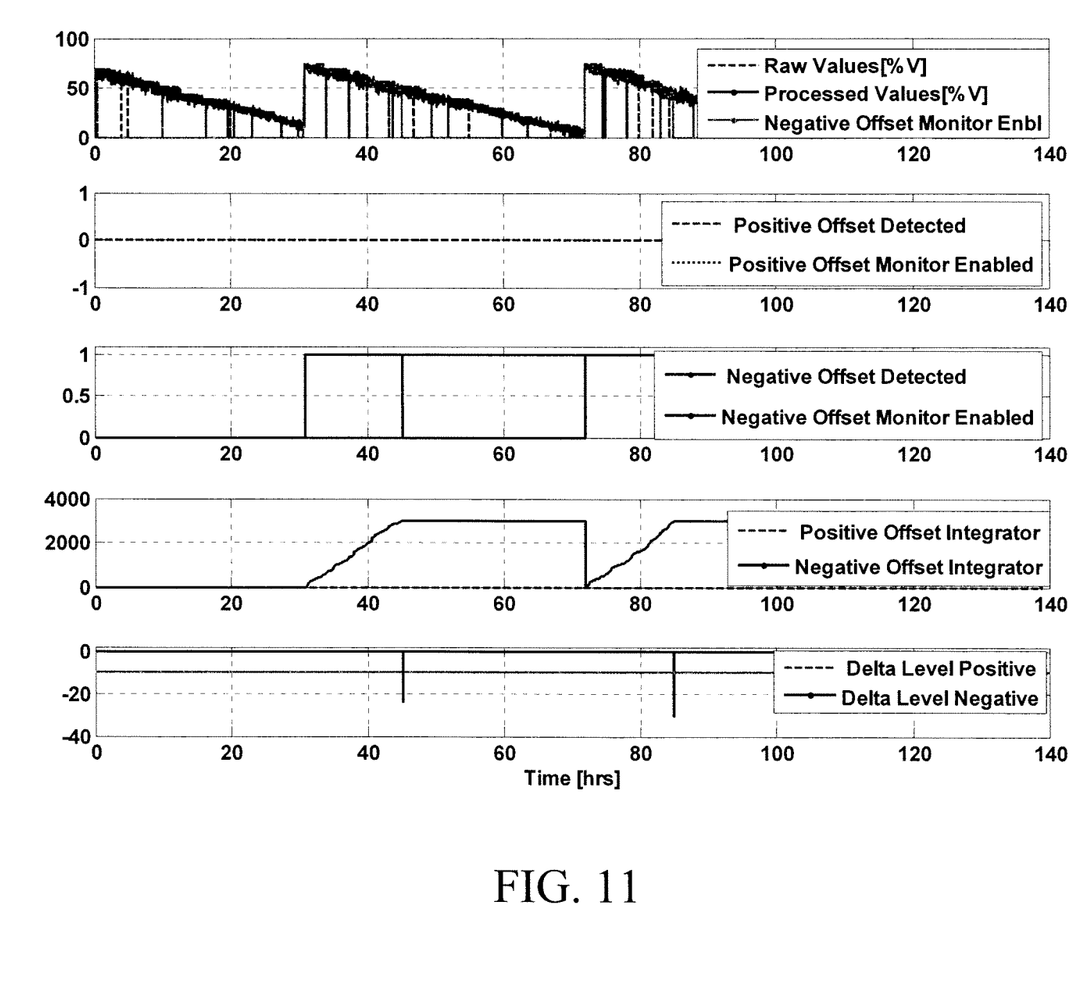
FIG. 11 is a chart depicting an exemplary rationality diagnostic for sensor negative according to one embodiment.

FIG. 9 is a chart depicting an exemplary rationality diagnostic for sensor gain according to one embodiment. The chart depicts raw tank level values received over time as well as conditioned tank level values used in the rationality diagnostics of the sensor, as well as corresponding positive and negative offset detection and related diagnostic decisions. In the example, four diagnostic decisions are made in response to each refill/reset event. Similarly, FIG. 10 is a chart depicting an exemplary rationality diagnostic for sensor positive offset according to one embodiment. The chart depicts raw tank level values received over time as well as conditioned tank level values used in the rationality diagnostics of the sensor, as well as corresponding positive and negative offset detection and related diagnostic decisions. In the example, the sensor is monitored for positive offset but the offset is determined to be less than the positive offset threshold. FIG. 11 is a chart depicting an exemplary rationality diagnostic for sensor negative offset according to one embodiment. The chart depicts raw tank level values received over time, conditioned tank level values used in the rationality diagnostics of the sensor, and corresponding positive and negative offset detection and related diagnostic decisions. In the example, the sensor is monitored for negative offset but the offset is greater than the negative offset threshold.

In certain implementations, the systems or processes described herein can include a controller structured to perform certain operations described herein. In certain implementations, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain implementations, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIGS. 2-6.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A computer-implemented method for diagnosing a sensor of a reductant tank of an exhaust aftertreatment system, comprising:
   recirculating reductant from the reductant tank to a doser to cool the doser;
   receiving a first tank level value from a sensor at a beginning of a monitored time period;
   receiving a plurality of reductant dosing command values over the monitored time period;
   determining a dosed reductant value for the monitored time period responsive to the plurality of reductant dosing command values reaching a threshold integrated value;
   receiving a second tank level value from the sensor at an end of a monitored time period responsive to the dosed reductant value reaching the threshold integrated value;
   determining a sensor-estimated dosing value for the monitored time period based on a difference between the first tank level value and the second tank level value;
   diagnosing the sensor as performing outside of an acceptable calibration range based on a difference between the sensor-estimated dosing value and the dosed reductant value for the same monitored time period; and
   responsive to diagnosing the sensor as performing outside of the acceptable calibration range, sending a diagnostic decision to an on-board diagnostic system indicating that the sensor is performing outside of the acceptable calibration range.

2. The computer-implemented method of claim 1, wherein the plurality of reductant dosing command values and the first tank level value are received after a reset event responsive to a previous sensor diagnostic decision or a refill detection.

3. The computer-implemented method of claim 1, wherein the diagnosing of the sensor is further based on the sensor-estimated dosing value corresponding to a tank volume that is above an upper gain threshold value or below a lower gain threshold value.

4. The computer-implemented method of claim 3, wherein the sent diagnostic decision that the sensor is performing outside of the acceptable calibration range is based upon diagnosing a positive gain in response to the sensor-estimated dosing value corresponding to a tank volume that is above the upper gain threshold value.

5. The computer-implemented method of claim 3, wherein the sent diagnostic decision indicating the sensor is performing outside of the acceptable calibration range is based upon diagnosing a negative gain in response to sensor-estimated dosing value corresponding to a tank volume that is below the lower gain threshold value.

6. The computer-implemented method of claim 1, further comprising:
   determining the first tank level value is indicative of the reductant tank that is initially full;
   wherein the diagnosing of the sensor is further based on the sensor-estimated dosing value corresponding to a tank volume that is above a positive offset threshold value.

7. The computer-implemented method of claim 1, further comprising:
   determining the first tank level value is indicative of the reductant tank that is less than 80% full;

wherein the diagnosing of the sensor is further based on the sensor-estimated dosing value corresponding to a tank volume that is above a negative offset threshold value.

8. The computer-implemented method of claim 7, wherein the diagnosing of the sensor is further based on a dead band volume within the reductant tank.

9. A reductant tank sensor diagnostic system comprising:
a reductant tank storing reductant;
a doser;
a tank level sensor; and
a controller communicatively coupled to the tank level sensor and comprising:
  a recirculation circuit structured to cause recirculation of reductant from a reductant tank to a doser to cool the doser;
  a tank level sensing circuit structured to access a first value at a beginning of a monitored time period indicative of a first tank level value based on output from a tank level sensor;
  a reductant dosing circuit structured to access a plurality of reductant dosing command values over the monitored time period;
  a dosing integration circuit structured to determine a dosed reductant value for the monitored time period responsive to the plurality of reductant dosing command values reaching a threshold integrated value;
  the tank level sensing circuit further structured to access a second value at an end of a monitored time period indicative of a second tank level value based on output from a tank level sensor responsive to the dosed reductant value reaching the threshold integrated value;
  a dosing estimation circuit structured to determine a sensor-estimated dosing value for the monitored time period based on a difference between the first value and the second value; and
  a sensor diagnostic circuit structured to diagnose the sensor as performing outside of an acceptable calibration range based on a difference between the sensor-estimated dosing value and the dosed reductant value for the same monitored time period.

10. The system of claim 9, wherein the plurality of reductant dosing command values and the first value are accessed after a reset event responsive to a previous sensor diagnostic decision or a refill detection.

11. The system of claim 9, wherein the diagnosing of the sensor is further based on the sensor-estimated dosing value corresponding to a tank volume that is above an upper gain threshold value or below a lower gain threshold value.

12. The system of claim 11, wherein the circuit is further configured to send a diagnostic decision to an on-board diagnostic system indicating that the sensor is performing outside of the acceptable calibration range based upon diagnosing a positive gain in response to the sensor-estimated dosing value corresponding to a tank volume that is above the upper gain threshold value.

13. The system of claim 11, wherein the circuit is further configured to send a diagnostic decision to an on-board diagnostic system indicating the sensor is performing outside of the acceptable calibration range based upon diagnosing a negative gain in response to the sensor-estimated dosing value corresponding to a tank volume that is below the lower gain threshold value.

14. The system of claim 9, wherein the circuit is further configured to:
determine the first value is indicative of the reductant tank that is full; and
wherein the diagnosing of the sensor is further based on the sensor-estimated dosing value corresponding to a tank volume that is above a positive offset threshold value; and
send a diagnostic decision to an on-board diagnostic system indicating the sensor is defective.

15. The system of claim 9, wherein the circuit is further configured to:
determine the first value is indicative of the reductant tank that is less than 80% full;
wherein the diagnosing of the sensor is further based on the sensor-estimated dosing value corresponding to a tank volume that is above a negative offset threshold value; and
send a diagnostic decision to an on-board diagnostic system indicating the sensor is defective.

16. The system of claim 15, wherein the diagnosing of the sensor is further based on a dead band volume within the reductant tank.

17. An apparatus for diagnosing a reductant tank sensor comprising:
a recirculation circuit structured to cause recirculation of reductant from a reductant tank to a doser to cool the doser;
a tank level sensing circuit structured to access a first value at a beginning of a monitored time period indicative of a first tank level value based on output from a tank level sensor;
a reductant dosing circuit structured to access a plurality of reductant dosing command values over the monitored time period;
a dosing integration circuit structured to determine a dosed reductant value for the monitored time period responsive to the plurality of reductant dosing command values reaching a threshold integrated value;
the tank level sensing circuit further structured to access a second value at an end of a monitored time period indicative of a second tank level value based on output from a tank level sensor responsive to the dosed reductant value reaching the threshold integrated value;
a dosing estimation circuit structured to determine a sensor-estimated dosing value for the monitored time period based on a difference between the first value and the second value;
a sensor diagnostic circuit structured to diagnose the sensor as performing outside of an acceptable calibration range based on a difference between the sensor-estimated dosing value and the dosed reductant value for the same monitored time period; and
a diagnostic transmission circuit structured to send a diagnostic decision to an on-board diagnostic system indicating that the sensor is performing outside of the acceptable calibration range.

18. The apparatus of claim 17, wherein the plurality of reductant dosing command values and the first value are received after a reset event responsive to a previous sensor diagnostic decision or a refill detection.

19. The apparatus of claim 17, wherein the diagnosing of the sensor is further based on the sensor-estimated dosing value corresponding to a tank volume that is above an upper gain threshold value or below a lower gain threshold value.

20. The apparatus of claim 19, wherein the sent diagnostic decision that the sensor is performing outside of the acceptable calibration range is based upon diagnosing a positive gain in response to the sensor-estimated dosing value corresponding to a tank volume that is above the upper gain threshold value.

21. The apparatus of claim 19, wherein the sent diagnostic decision that the sensor is performing outside of the acceptable calibration range is based upon diagnosing a negative gain in response to the sensor-estimated dosing value corresponding to a tank volume that is below the lower gain threshold value.

22. The apparatus of claim 17, wherein the sensor diagnostic circuit is further structured to:
   determine the first value is indicative of the reductant tank that is full;
   wherein the diagnosing of the sensor is further based on the sensor-estimated dosing value corresponding to a tank volume that is above a positive offset threshold value.

23. The apparatus of claim 17, wherein sensor diagnostic circuit is further structured to:
   determine the first value is indicative of the reductant tank that is less than 80% full;
   wherein the diagnosing of the sensor is further based on the sensor-estimated dosing value corresponding to a tank volume that is above a negative offset threshold value.

24. The apparatus of claim 23, wherein the diagnosing of the sensor is further based on a dead band volume within the reductant tank.

* * * * *

UNITED STATES PATENT AND TRADEMARK OFFICE
CERTIFICATE OF CORRECTION

Page 1 of 1

PATENT NO. : 10,094,264 B2
APPLICATION NO. : 14/530091
DATED : October 9, 2018
INVENTOR(S) : Nassim Khaled et al.

It is certified that error appears in the above-identified patent and that said Letters Patent is hereby corrected as shown below:

On the Title Page

Item (72) Inventors, should read:
Nassim Khaled, Columbus, IN (US);
Vinayak Mandavkar, Columbus, IN (US);
Deepu Chandy, Columbus, IN (US);
Orlando Dwayne Prevot, Columbus, IN (US)

Signed and Sealed this
Fourteenth Day of May, 2019

Andrei Iancu
*Director of the United States Patent and Trademark Office*